Figure 1:
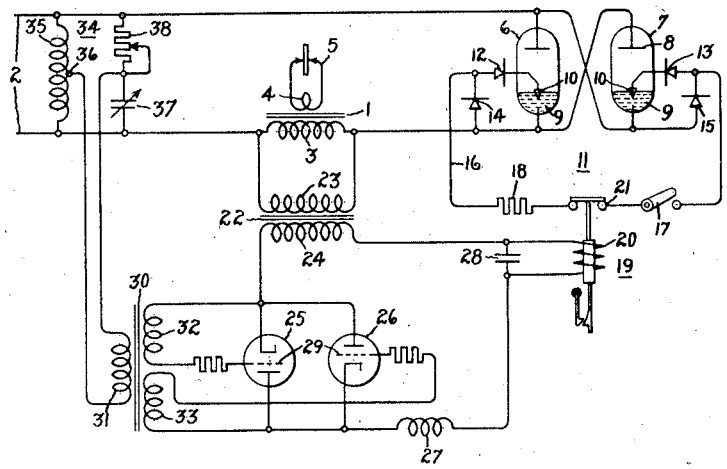

Feb. 5, 1946.   O. W. LIVINGSTON   2,394,084
ELECTRIC CONTROL AND PROTECTIVE SYSTEMS
Filed July 21, 1942    2 Sheets-Sheet 1

Inventor:
Orrin W. Livingston,
by Harry E. Dunham
His Attorney.

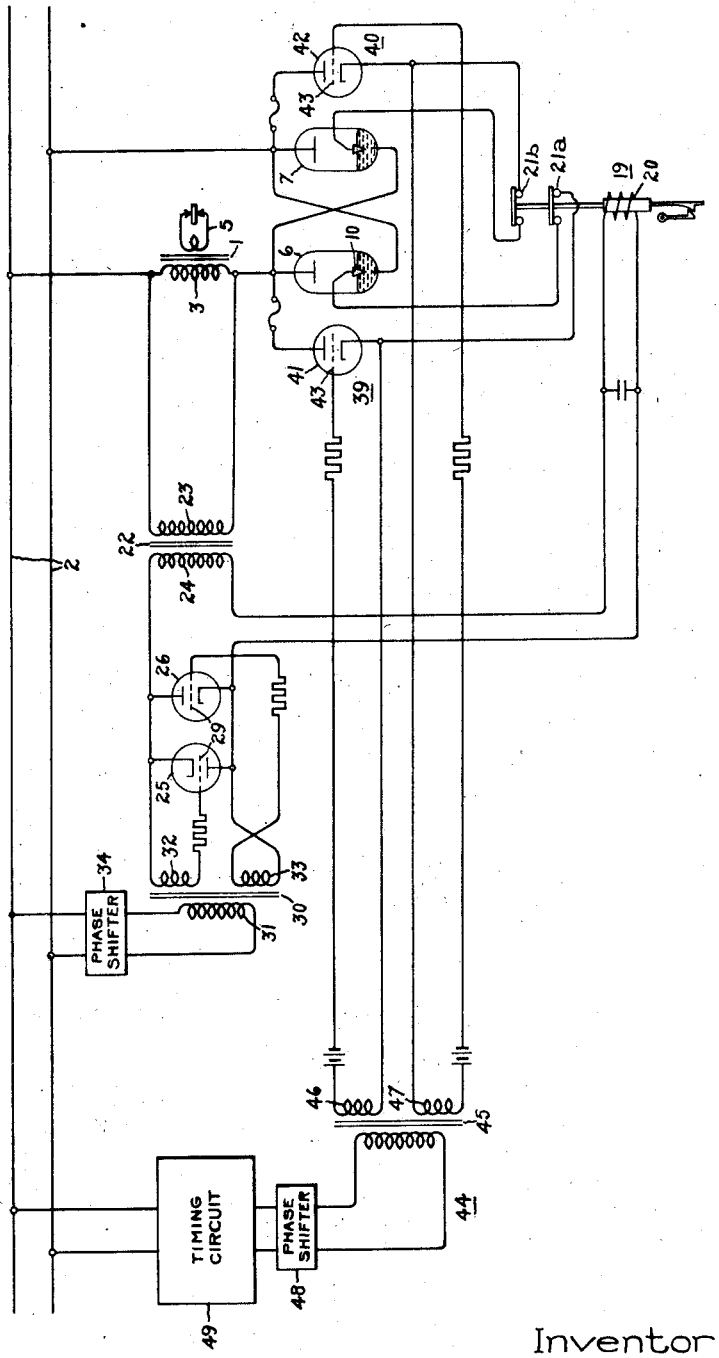

Patented Feb. 5, 1946

2,394,084

UNITED STATES PATENT OFFICE 2,394,084

ELECTRIC CONTROL AND PROTECTIVE SYSTEMS

Orrin W. Livingston, Scotia, N. Y., assignor to General Electric Company, a corporation of New York Application July 21, 1942, Serial No. 451,732

17 Claims. (Cl. 175—294)

My invention relates to electric circuits and more particularly to control and protective circuits for electric translating apparatus.

In electric systems, such as electric power translating systems, it is frequently desirable to provide control or protective systems for the translating apparatus in the event the system departs from a predetermined desired mode or sequence of operation. In accordance with the teachings of my invention described hereinafter, I provide new and improved protective systems for electric translating apparatus, such as electric valve translating apparatus, whereby the control and protective operations are accomplished without imposing any limitation on the required or desired flexibility of operation of the translating system.

It is an object of my invention to provide new and improved electric control or protective systems.

It is another object of my invention to provide new and improved control and protective systems for electric valve translating apparatus.

It is a further object of my invention to provide new and improved control and protective circuits for electric translating apparatus where it is desired to energize a load device or a load circuit, from an alternating current supply circuit, and wherein the protective circuit operates in the event the desired alternate opposing energization of the load device is not completed.

It is a still further object of my invention to provide new and improved control circuits for electric valve translating apparatus, such as a pair of reversely connected electric valve means which are employed to transmit alternating current to a load device, such as a welding transformer, and wherein energization of the welding transformer is prevented in the event one of the electric valves fails to conduct current.

Briefly stated, in the illustrated embodiments of my invention I provide control or protective circuits for a pair of reversely connected electric valves which control the flow of alternating current to a load circuit such as a welding circuit. The control circuit comprises means which discriminates between unidirectional magnetization or energization of the load device or circuit, and more particularly include means, such as a pair of reversely connected electric discharge devices of the controlled type, which supply or produce an alternating voltage in the event the electric valve means conduct current alternately, but which produce a predominantly unidirectional voltage in the event one of the electric valve means fails to conduct current. The grids of the electric discharge devices are energized by impressing thereon periodic voltages of predetermined phase relation so that the electric discharge devices are highly discriminatory in the detection of failure to conduct by one of the electric valve means, even though the system is adjusted to produce or effect a relatively small energization of the load device or load circuit.

Figure 3:
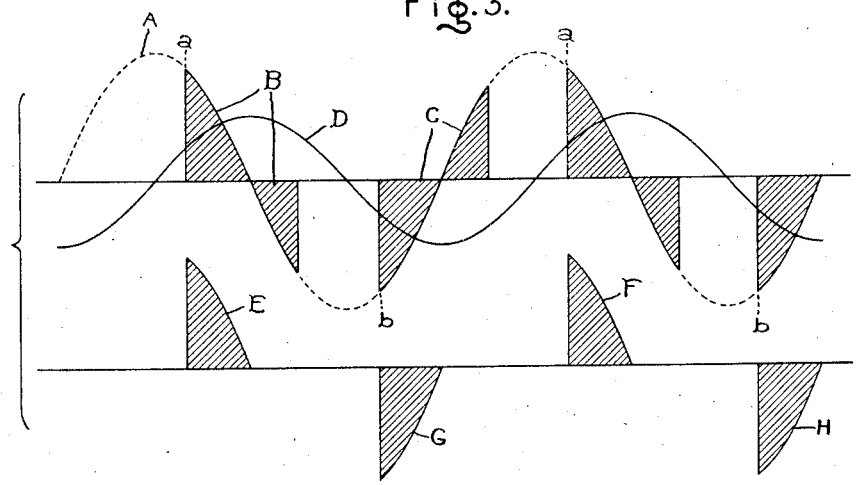

For a better understanding of my invention, reference may be had to the following description taken in connection with the accompanying drawings, and its scope will be pointed out in the appended claims. Fig. 1 of the accompanying drawings diagrammatically illustrates an embodiment of my invention as applied to an electric valve translating system for transmitting alternating current to a load circuit, such as a welding circuit, and Fig. 2 represents a modification of the arrangement shown in Fig. 1 wherein the main electric valve means are controlled by trigger valves and wherein the system is provided with apparatus for adjusting or controlling the magnitude of the current transmitted to the welding circuit during predetermined intervals of time established by a timing circuit. Fig. 3 represents certain operating characteristics of the arrangement shown in Fig. 2.

Referring to Fig. 1 of the accompanying drawings, my invention is there illustrated as applied to a system where it is desired to effect energization of a load device, such as a welding transforming means 1 from a supply circuit which may be an alternating current supply circuit 2, and wherein successive impulses of current transmitted to primary winding means 3 are of opposite polarity determined or established by a timed-directional pattern of energization. This timed-directional energization of the welding transforming means 1 may be a function of the time relation established by the voltage of the alternating current circuit 2. Secondary winding means 4 of the transforming means 1 is connected to a load circuit such as a welding circuit 5.

The amount of current transmitted to the primary winding means 3 and the alternate opposing energization of the primary winding means 3 may be effected by suitable circuit controlling means, such as a pair of reversely connected electric valve means 6 and 7 which are connected between the alternating current supply circuit 2 and transforming means 1. The electric valve means 6 and 7 are preferably of the type employing an ionizable medium capable of supporting an arc discharge, and each comprises an anode 8, a cathode which may be a mercury pool cathode 9, and a control member such as an immersion-ignitor control member 10 associated with the cathode and having an extremity thereof extending into the mercury of the pool. Immersion-ignitor control members 10 are preferably constructed of a material such as boron-carbide or silicon-carbide having an electrical resistivity which is large compared with that of the mercury of the associated pool.

I provide control means or excitation means for electric valve means 6 and 7 which controls the time of initiation of current conduction by electric valve means 6 and 7, and which may comprise an excitation circuit 11 connected between the immersion-ignitor control members 10 through unidirectional conducting devices 12 and 13 to assure that only unidirectional current is transmitted to the control members. In order to derive energizing potential from the alternating current circuit 2 for the control members 10 and as a means for reducing the inverse voltage impressed between a cathode and its associated control member during the negative or inverse half cycles of applied anode-cathode voltage, I employ a second pair of unidirectional conducting devices 14 and 15 which are connected between cathodes 9 and unidirectional conducting devices 12 and 13, respectively.

Excitation circuit 11 includes a conductor 16 which is connected between the common junctures of unidirectional conducting devices 12, 14, and 13, 15 and includes a control means such as a switch 17, a current limiting resistance 18 and control means such as an electromagnetic relay 19.

Relay 19 includes an actuating coil 20 and normally closed contacts 21 which are connected in the excitation circuit 11. Relay 19 may be of the type which discriminates between alternating voltages applied to its actuating coil 20 and unidirectional voltages or predominately unidirectional voltages applied thereto. In the illustrated embodiment of my invention, I have chosen to represent the relay as being of the type which maintains its contacts 21 closed so long as an alternating voltage is applied across its actuating coil 20, but which opens its contacts 21 if a predominately unidirectional voltage is applied thereto. Relay 19 upon operation, of course, interrupts the excitation circuit 11, preventing the transmission of energizing impulses of current to the control members 10.

In order to obtain selective operation of relay 19 in response to normal and abnormal operation of the electric valve translating system, and more particularly to provide means for discriminating between alternate opposing energizations of the transforming means 1 and unidirectional energization thereof, I provide apparatus responsive to the direction of energization of the transforming means 1 and which selectively controls the nature of the voltage applied to the actuating coil 20 of relay 19.

As a means for obtaining a voltage indicative of the direction of energization or magnetization of the transforming means 1, I employ an inductive device such as a transformer 22 having primary winding means 23 which are connected to transforming means 1, or which may be connected across the primary winding means 3. Secondary winding means 24 of transformer 22 is connected to a pair of reversely connected electric discharge devices 25 and 26. Electric discharge devices 25 and 26 are connected in circuit with actuating coil 20 of relay 19 and secondary winding means 24 of transformer 22. A smoothing reactance 27 may be connected in series relation with electric discharge devices 25 and 26 if desired. Furthermore, a capacitance 28 may be connected across actuating coil 20 to obtain a substantially continuous energization of coil 20 when a pulsating unidirectional voltage is impressed thereacross.

The electric discharge devices 25 and 26 may be either of the high vacuum type or of the type employing an ionizable medium, such as a gas or a vapor, and each comprises an anode-cathode circuit connected to the secondary winding means 24 and each comprises a control member or grid 29 the potential of which determines the time at which these discharge devices conduct current.

Means are provided to render the electric discharge devices 25 and 26 selectively conductive in accordance with the timed-directional energization or magnetization of the transforming means 1. That is, I provide means for impressing on the grids 29 of electric discharge devices 25 and 26 timed or periodic voltages such as alternating voltages which, in conjunction with the anode-cathode voltages supplied by secondary winding means 24, render the electric discharge devices 25 and 26 conducting alternately and thereby control the nature of the voltage impressed on actuating coil 20 of relay 19.

The periodic voltages impressed on grids 29 of electric discharge devices 25 and 26 may be obtained by employing a transformer 30 having a primary winding 31 and secondary windings 32 and 33 which are connected to grids 29 of discharge devices 25 and 26, respectively. The phase of the periodic voltages impressed on grids 29 with respect to the desired timed-directional energization of transforming means 1 may be controlled or adjusted by means of a phase shifting circuit 34 which may be of the static impedance type including adjustable resistive, inductive or capacitive elements. For example, I may employ an inductance 35 for producing a potential intermediate that of the voltage of the supply circuit 2 at tap 36 and a serially connected capacitance 37 and a resistance 38, the primary winding 31 being connected between tap 36 and the common juncture of capacitance 37 and resistance 38.

The operation of the embodiment of my invention shown in Fig. 1 will be explained by considering the system under normal operation wherein alternating current is transmitted to the welding circuit 5. Switch 17, of course, is closed and the electric valve means 6 and 7 conduct current alternately. The time of initiation of current flow during the respective positive half cycles of applied anode-cathode voltage is determined by the time at which the anode voltage attains that value which is sufficient to effect the establishment of a cathode spot on the associated cathode. Of course, the time at which the anode voltage attains the value which is sufficient to establish discharge depends upon the power factor of the connected load. The time at which the voltage reaches this critical value may range from a position lagging the zero point of the positive half cycles by a few degrees for a resistive load to the 90 electrical degree point for a zero power factor inductive load. For example, when the upper conductor of supply circuit 2 is positive, an impulse of unidirectional current is transmitted to control member 10 of electric valve means 6 through a circuit including unidirectional conducting device 15, switch 17, contacts 21, resistance 18, unidirectional conducting device 12, control member 10 and cathode 9 of electric valve means 6. Upon establishment of the cathode spot, electric valve means 6 conducts current inasmuch as its anode is positive. During the succeeding half cycle of voltage of supply circuit 2, electric valve means 7 is rendered conducting by the transmission of current through unidirectional conducting devices 14 and 13 and the other associated elements of the excitation circuit 11. So long as the electric valve means 6 and 7 conduct current alternately, relay 19 maintains its contacts 21 closed due to the fact that relay 19 is designed to operate only in response to a unidirectional voltage supplied thereto, and since under normal operation, as will be explained hereinafter, the voltage supplied to actuating coil 20 is alternating.

So long as successive energizations of the transforming means 1 are opposing, the electric discharge devices 25 and 26 conduct current alternately so that alternating voltage and current are supplied to actuating coil 20 of the relay 19. This alternate conduction of current by electric discharge devices 25 and 26 is effected by the conjoint operation of the alternating voltage appearing across secondary winding means 24 of transformer 22 and the 180 electrical degree displaced voltages supplied to grids 29 of discharge devices 25 and 26.

In the event one of the electric valve means 6 or 7 fails to conduct current, it will be appreciated that over a period of time, such as a few cycles, the energization of the transforming means 1 will be unidirectional. Consequently, only one of the discharge devices 25 or 26 will have positive anode voltage applied thereto at the time its grid voltage is positive, so that only unidirectional current is transmitted to actuating coil 20 of relay 19. Accordingly, upon the transmission of unidirectional current to coil 20, relay 19 is energized opening its contacts 21 and thereby preventing operation of the translating system and consequently preventing energization of the transforming means 1 and the welding circuit 5. Such protection is of extreme importance due to the fact that the continued transmission of unidirectional current to the transforming means 1 will produce unidirectional magnetization of its core structure, thereby causing the transmission of different amounts of current to the welding circuit 5. Such variation in the magnitude of the welding current is critical in many welding operations where a precise limit of the values of welding current is necessary in order to obtain the desired quality of weld.

After operation, relay 19 is latched in the position which maintains contacts 21 open. After the correction of the fault condition which caused the abnormal operation, relay 19 may be reset.

Fig. 2 diagrammatically illustrates a modification of the arrangement shown in Fig. 1, and emphasizes the highly discriminatory nature of the control and protective systems which I provide. The elements of Fig. 2 have been assigned reference numerals corresponding to equivalent elements of Fig. 1.

In the system shown in Fig. 2, the welding circuit 5 is also energized from the alternating current supply circuit 2 through the pair of electric valve means 6 and 7 which are reversely connected in parallel so that alternating current is transmitted thereby. In this arrangement, I employ a pair of excitation circuits 39 and 40 which include trigger or control electric valves 41 and 42 which may be connected to be energized in response to the magnitude and polarity of the anode voltage of the associated electric valve means 6 and 7, respectively. The control electric valves 41 and 42 are preferably of the type employing an ionizable medium and each includes a control member or grid 43, the potential of which determines the time during a positive half cycle of anode voltage of the associated main electric valve at which current conduction through the associated immersion-ignitor control member 10 is initiated. The time of conduction of the control electric valves 41 and 42 is determined by a control circuit 44 including means for impressing on the grids 43 periodic or alternating voltages displaced substantially 180 electrical degrees relative to each other. This apparatus may include a transformer 45 having properly poled secondary windings 46 and 47. I provide phase shifting means 48 which may be of the static impedance type to control or adjust the phase of the alternating voltages impressed on grids 43, thereby controlling the time of current conduction by electric valve means 6 and 7 and, hence, providing means for controlling the magnitude of the current and energy transmitted to the welding circuit 5.

As a further refinement, I may employ a timing circuit 49 which may be an ordinary time operated contactor mechanism or relay to effect energization of control circuit 44 for predetermined intervals of time, and to maintain predetermined intervals of time between successive energizations of the welding circuit 5. As an additional matter, the timing circuit 49 may be of a type well known in the art wherein energization of circuit 44 is effected for a period of time, and wherein after the expiration of the interval of time energization of circuit 44 is terminated pending a circuit resetting or reinitiating operation.

Relay 19, in the embodiment of my invention shown in Fig. 2, may be provided with contacts 21a and 21b which are connected in excitation circuits 39 and 40 associated with electric valve means 6 and 7, respectively. Relay 19 in this embodiment of the invention is also selectively responsive to alternating voltage and unidirectional voltage applied to the actuating coil 20.

In operation, the embodiment of my invention shown in Fig. 2 is fundamentally the same as that shown in Fig. 1. So long as the electric valve means 6 and 7 conduct current alternately, relay 19 maintains its contacts 21a and 21b closed due to the fact that alternating voltage is applied to coil 20. The magnitude of the current transmitted to welding circuit 5 is controllable or adjustable by means of phase shifting means 48. As will be well understood by those skilled in the art, as the times of initiation of current conduction by electric valve means 6 and 7 are retarded, the magnitude of the current transmitted to the welding circuit 5 is decreased; and conversely as the times of initiation of current conduction are advanced, the magnitude of the welding current is increased.

The period or the interval of time during which welding circuit 5 is energized is determined by the character and setting of the timing circuit 49. Circuit 49 may be adjusted to effect a single energization of the welding circuit 5, or may be adjusted to effect periodic or intermittent energization thereof.

The manner in which the protective circuit shown in Fig. 2 operates may be more fully appreciated by referring to the operating characteristics shown in Fig. 3, wherein the broken curve A represents the voltage of the alternating current supply circuit 2. The operating characteristics of Fig. 3 represent that condition wherein the phase shifting means 48 is adjusted so that the electric valve means 6 begins current conduction at times $a$, and the electric valve means 7 begins current conduction at times $b$. The shaded portions B and C represent the voltage applied to the transforming means 1 or the load voltage, and consequently represent the voltage applied to the anode-cathode circuits of electric discharge devices 25 and 26. It will be noted that by virtue of the inductive characteristics of the load circuit, each of these shaded areas includes a positive portion and a negative portion of anode voltage applied to electric discharge devices 25 and 26. It will be also noted, however, that the negative portion is of substantially smaller area than the positive portion. The voltages impressed on grids 29 of electric discharge devices 25 and 26 are adjusted by means of the phase shifting circuit 34 so that the electric discharge devices are selectively responsive to only the positive portions of areas B and C. Consequently, the circuit including electric discharge devices 25 and 26 is highly discriminatory relative to critical portions of the voltage appearing across transforming means 1 occasioned by the conduction of electric valve means 6 and 7. The grid voltage impressed on one of the electric discharge devices, such as discharge device 25, is represented by curve D. It will be appreciated that the voltage impressed on grid 29 of discharge device 26 is displaced 180 electrical degrees relative to curve D.

By virtue of the combined action of the voltage of winding 24 and the grid excitation of the electric discharge devices 25 and 26, under normal operation of electric valve means 6 and 7 the voltage impressed on actuating coil 20 of relay 19 will be that represented by curves E, F, G and H; that is, the voltage impressed across coil 20 is alternating and the voltage produced by electric discharge device 25 is represented by curves E and F, and the voltage produced by discharge device 26 is represented by curves G and H.

It will be seen, in view of the above discussion with particular reference to the operating characteristics shown in Fig. 3, that positive control of the alternating and unidirectional voltages impressed on actuating coil 20 is obtained under normal and abnormal operation, respectively. In the absence of the electric valve means 25 and 26, it will be appreciated that even during normal operation the net or resultant voltage impressed on actuating coil 20 would not be well defined because of the positive and negative portions of the voltage impressed across the load circuit which would tend to decrease the sensitivity of relay 19. By virtue of my invention, the electric discharge devices 25 and 26, under normal operation, produce well defined alternate impulses of energizing voltage and current so that relay 19 is correctly energized.

In the event one of the electric valve means 6 and 7 fails to conduct current, it will be appreciated that one of the electric discharge devices 25 or 26 will not conduct current, effecting the application of a well defined unidirectional voltage on actuating coil 20 of relay 19 and causing it, accordingly, to open its contacts 21a and 21b. In this manner, further operation of the translating system and energization of the welding circuit 5 are prevented until relay 19 is reset.

One of the important advantages of a control or protective system built in accordance with my invention is that a constant energization of the protective relay 19 is obtained under normal operating conditions. That is, irrespective of the amount of current transmitted to the welding circuit established by the setting of phase shifter 48, the protective circuit may be adjusted to supply the same value of alternating current to the actuating coil 20 of the relay 19 under normal operating conditions. It will be appreciated that the phase of the grid voltages, one of which is represented by curve D of Fig. 3, may be retarded so that the conduction of current by discharge devices 25 and 26 does not begin until after the corresponding main power electric valve means 6 or 7 begins to conduct. This means that the amplitude of the normal alternating current excitation of actuating coil 20 of relay 19 is limited and remains substantially constant as the times are advanced at which the main electric valve means 6 and 7 are rendered conducting. This permits a sensitive setting of relay 19, or the use of a highly sensitive and discriminatory relay, since it minimizes the possibility of rapid vibratory action under large values of alternating current excitation.

While I have shown and described my invention as applied to particular systems of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a supply circuit, a load device, circuit controlling means connected between said supply circuit and said load device for alternately energizing said load device in opposite directions in accordance with a predetermined timed-directional energization pattern, and means responsive to unidirectional current transmitted to said load device for preventing energization thereof from said supply circuit and comprising a pair of reversely connected electric discharge devices each having a control member for controlling the conductivity thereof and means for impressing on said control members periodic voltages having a periodicity and polarity to render said electric discharge devices conducting alternately in accordance with the desired timed-directional energization of said load device.

2. In combination, an alternating current circuit, a load device, means for energizing said load device in opposite directions as a function of the time relation established by the voltage of said alternating current circuit, and means responsive to unidirectional current transmitted to said load device for preventing continued unidirectional energization thereof and comprising a pair of reversely connected electric discharge devices each having a grid for controlling the conductivity thereof and means energized from said supply circuit for impressing periodic voltages on said grids and being poled to render said discharge devices conductive alternately in accordance with the desired timed-directional energization of said load device.

3. In combination, an alternating current circuit, a load device, means connected between said load device and said circuit for energizing said load device in opposite directions as a function of the time relation established by the voltage of said alternating current circuit, control means for said last mentioned means and comprising an electromagnetic relay having an actuating coil and being of the character which operates in response to a predominately unidirectional voltage impressed across said coil, and means for effecting selective operation of said relay in response to the energization of said load device and comprising a pair of reversely connected electric discharge devices each having a grid for controlling the conductivity thereof and means energized from said supply circuit for impressing periodic voltages on said grids and being poled to render said discharge devices conductive alternately in accordance with the desired timed-directional energization of said load device.

4. In combination, an alternating current circuit, a load device, means for energizing said load device in opposite directions as a function of the time relation established by the voltage of said alternating current circuit, control means for the last mentioned means and comprising an electromagnetic relay comprising an actuating coil for effecting operation of said relay in response to unidirectional voltages applied to said coil, and means responsive to the direction of current transmitted to said load device for controlling the voltage impressed across said coil and comprising a pair of reversely connected electric discharge devices each having a grid for controlling the conductivity thereof and means energized from said supply circuit for impressing periodic voltages on said grid and being poled to render said discharge devices conductive alternately in accordance with the desired timed-directional energization of said load device so that under normal operation an alternating voltage is impressed across said coil thereby preventing operation of said relay and whereby under abnormal operating conditions a unidirectional voltage is impressed across said actuating coil to effect operation of said relay.

5. In combination, an alternating current circuit, a load device, means for energizing said load device in opposite directions as a function of the timed relation established by the voltage of said alternating current circuit, control means for said last mentioned means and comprising an inductive device having primary winding means connected to said load device and including secondary winding means, a pair of reversely connected electric discharge devices having anode-cathode circuits connected to said secondary winding means and said control means and each having a control grid for controlling the conductivity thereof, and means energized from said supply circuit for impressing periodic voltages on said grids and being poled to render said discharge devices conductive alternately in accordance with the desired timed polarization of said secondary winding means.

6. In combination, an alternating current circuit, a load device, means for energizing said load device in opposite directions as a function of the time relation established by the voltage of said alternating current circuit, control means for said last mentioned means, and means for operating said control means and for discriminating between alternate opposing energization of said load device and unidirectional energization of said load device comprising a pair of reversely connected electric discharge devices responsive to the voltage of said load device, said electric discharge devices each having a control grid for controlling the conductivity thereof, and including means energized from said supply circuit for impressing periodic voltages on said grids and being poled to render said discharge devices conductive alternately in accordance with the desired timed-directional energization of said load device.

7. In combination, an alternating current supply circuit, a load circuit, transforming means connected to said load circuit, a pair of reversely connected electric valve means connected between said supply circuit and said transforming means, control means for said electric valve means, and means for controlling said control means and for controlling the energization of said load circuit comprising means responsive to the direction of energization of said transforming means and including an inductive device connected to said transforming means, a pair of reversely connected electric discharge devices connected to said inductive device and each having a grid for controlling the conductivity thereof and means for energizing the grids to render the discharge devices respectively responsive to positive and negative unidirectional energization of said transforming means.

8. In combination, an alternating current supply circuit, a load circuit, transforming means connected to said load circuit, a pair of reversely connected electric valve means connected between said supply circuit and said transforming means for transmitting current alternately to said transforming means, control means for said electric valve means, and means for controlling said control means in response to the direction of energization of said transforming means and comprising a pair of reversely connected electric discharge devices each having a control grid for controlling the conductivity thereof and means energized from said supply circuit for impressing periodic voltages on said grids and being poled to render said discharge devices conductive alternately in accordance with the desired timed-directional energization of said load device.

9. In combination, an alternating current supply circuit, a load circuit, transforming means connected to said load circuit, a pair of reversely connected electric valve means connected between said supply circuit and said transforming means, each of said electric valve means having a control member for controlling the conductivity thereof, a control circuit for energizing said control members, and means for controlling said control circuit to prevent operation of said control circuit in the event one of said electric valve means fails to conduct current in the desired sequence of operation comprising means responsive to the magnetization of said transforming means and including a pair of reversely connected electric discharge devices each having a grid for controlling the conductivity thereof and means energized from said supply circuit for impressing on the grids periodic voltages and poled to render said discharge devices conductive alternately in accordance with the desired timed-directional energization of said load device.

10. In combination, an alternating current supply circuit, a load circuit, transforming means connected to said load circuit, a pair of reversely connected electric valve means connected between said supply circuit and said transforming means and each comprising a control member for controlling the conductivity thereof, a control circuit connected to said control members, and means for preventing energization of said load circuit in the event one of said electric valve means fails to conduct current comprising means responsive to the magnetization of said transforming means and including a pair of reversely connected electric discharge devices each having a grid and means energized from said supply circuit for impressing on said grids periodic voltages poled in accordance with the desired timed-directional energization of said load device.

11. In combination, an alternating current supply circuit, a load circuit, transforming means connected to said load circuit, circuit controlling means connected between said transforming means and said supply circuit for alternately energizing said transforming means in opposite directions, control means for said circuit controlling means, and means for controlling said control means in response to unidirectional magnetization of said transforming means and comprising an inductive device connected across said transforming means, a pair of reversely connected electric discharge devices connected to said inductive device, said discharge devices each having a grid for controlling the conductivity thereof and means for energizing said grids to render the discharge devices respectively responsive to positive and negative unidirectional magnetization of said transforming means.

12. In combination, an alternating current supply circuit, a load circuit, transforming means connected to said load circuit, circuit controlling means connected between said supply circuit and said transforming means for alternately transmitting unidirectional impulses of current of opposite polarity through said transforming means, and means for controlling said circuit controlling means in response to any deviation from the alternate energization of said transforming means comprising an inductive device connected to said transforming means, a pair of reversely connected electric discharge devices connected to said inductive device, said electric discharge devices each having a grid for controlling the conductivity thereof and an excitation circuit connected to said supply circuit for impressing on the grids periodic voltages displaced substantially 180 electrical degrees relative to each other to render said electric discharge devices responsive to the desired timed-directional magnetization of said transforming means.

13. In combination, an alternating current supply circuit, a load circuit, transforming means connected to said load circuit, a pair of reversely connected electric valve means connected between said supply circuit and said transforming means and each comprising a control member for controlling the conductivity thereof, a control circuit connected to said control members and comprising an electromagnetic relay having an actuating coil and being of the character which operates when a predominately unidirectional voltage is impressed across said actuating coil, and means for impressing a predominately unidirectional voltage across said coil when said electric valve means fails to conduct current alternately and comprising an inductive device connected to said transforming means, a pair of reversely connected electric discharge devices having anode-cathode circuits connected to said inductive device and to said coil, said electric discharge devices each having a grid for controlling the conductivity thereof, and including means energized from said supply circuit for impressing on said grids periodic voltages which cooperating with the voltage impressed on the anode-cathode circuits of the electric discharge devices from said inductive device tend to cause said electric discharge devices to conduct current alternately during normal operation and effecting the impression of a predominately unidirectional voltage across said actuating coil if one of the first mentioned electric valve means fails to conduct current in the desired sequence of operation.

14. In combination, a supply circuit, a load device, circuit controlling means connected between said supply circuit and said load device for alternately energizing said load device in opposite directions in accordance with a predetermined timed-directional energization pattern, and means responsive to the unidirectional current transmitted to said load device for controlling said circuit controlling means and for preventing energization of said load device from said supply circuit and comprising a pair of reversely connected electric discharge devices each having a control member for controlling the conductivity thereof and means for impressing on said control members periodic voltages having a periodicity and polarity to render said electric discharge devices conducting alternately in accordance with the desired timed-directional energization of said load device.

15. In combination, a supply circuit, a load device, circuit controlling means connected between said supply circuit and said load device for alternately energizing said load device in opposite directions in accordance with a predetermined timed-directional energization pattern, and means responsive to the direction of current transmitted to said load device for controlling said circuit controlling means and for disconnecting said load device from said supply circuit and comprising a pair of reversely connected electric discharge devices each having a control member for controlling the conductivity thereof and means for impressing on said control members periodic voltages having a periodicity and polarity to render said electric discharge devices conducting alternately so long as said load device is energized in accordance with said pattern.

16. In combination, a supply circuit, a load circuit, circuit controlling means connected between said supply circuit and said load circuit for alternately energizing said load device in opposite directions in accordance with a predetermined timed-directional energization pattern, means including an electromagnetic relay having an actuating coil for controlling said circuit controlling means, and means for supplying a substantially constant alternating current excitation to said actuating coil under normal operating conditions in response to the direction of current transmitted to said load device and including a pair of reversely connected electric discharge devices each having a control member for controlling the conductivity thereof and means for impressing on said control members periodic voltages having a periodicity and polarity to render said electric discharge devices conducting alternately in accordance with the desired timed-directional energization of said load device.

17. In combination, an alternating current supply circuit, a load device, a pair of reversely connected electric valve means connected between said supply circuit and said load device for alternately energizing said load device in opposite directions, control means for said electric valve means for determining the time during the respective positive half cycles of voltage applied thereto at which said electric valve means initiate current conduction, relay means for controlling said control means, and means responsive to the direction of current flow through said load device for supplying a substantially constant alternating current excitation to said relay means under normal operation of said electric valve means and comprising a pair of reversely connected electric discharge devices each having a control member and means for energizing said control members to render said electric discharge devices conducting alternately.

ORRIN W. LIVINGSTON.